United States Patent Office 3,517,680
Patented June 30, 1970

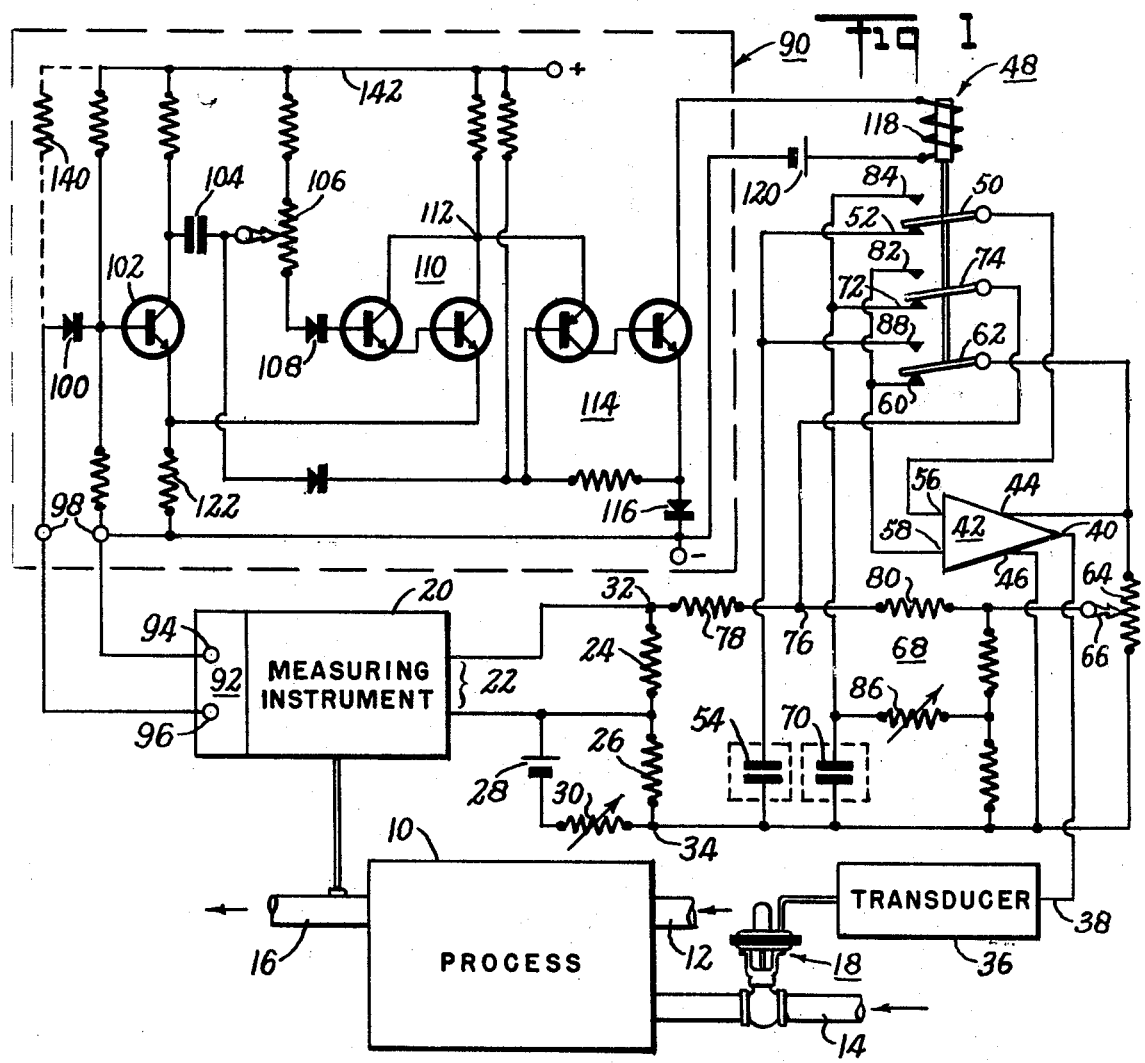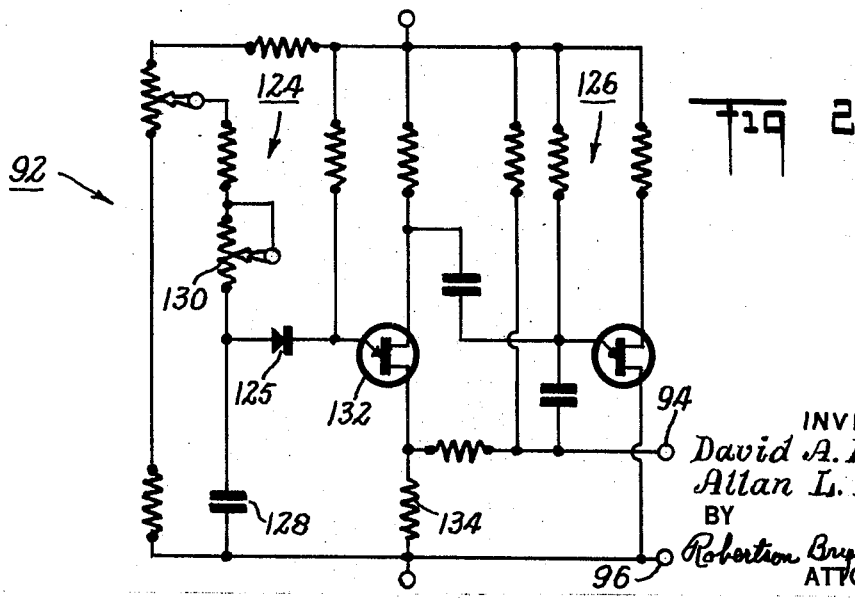

3,517,680
CONTROL APPARATUS AND METHOD FOR PROCESSES HAVING LONG TIME LAGS
David A. Richardson, Sheldonville, and Allan L. Flanagan, Attleboro, Mass., assignors to The Foxboro Company, Foxboro, Mass.
Filed Mar. 14, 1968, Ser. No. 713,199
Int. Cl. F17d 3/00; F16k 31/02
U.S. Cl. 137—2         12 Claims

ABSTRACT OF THE DISCLOSURE

A process control system especially for use with processes having relatively long dead-time delays, or wherein elements of the control system introduce unusually long time delays, the system including an electronic analog controller suited for producing a control current having a reset component, there also being provided cyclically operable switch means for transferring the controller between normal active automatic control status and a fixed output status with the control signal held at the level existing at the end of the preceding period of active automatic control, the system including a first memory capacitor to continuously sense the control current level during periods of automatic control so as to remember the value at the end of each such period in order to hold the control current at that level during the periods of fixed-output operation, the system also including a second memory capacitor to continuously sense certain process variables during the period of fixed-output operation, and operable thereby to provide a smooth bumpless return to active automatic control at the end of such period.

---

This invention relates to control systems for maintaining constant a condition of an industrial process. More particularly, this invention relates to systems especially adapted for controlling processes wherein there is a relatively long time lag between a change in some process factor (such as process load) and the corresponding variation in a measurement signal reflecting the value of the controlled process condition.

Automatic control systems have been used for many years with industrial processes to maintain constant various process conditions such as temperature, flow rate, etc. These control systems typically are of the analog feedback type, wherein a change in the value of the measured condition causes a proportionately corresponding variation in a valve setting or the equivalent so as to tend to counteract the change in the measured condition. Processes involving relatively long time lags generally present the most severe control problems, and a number of approaches have been devised to solve those problems. One common approach is to include so-called "reset" action (frequently combined with "rate" action) in the controller output signal, thereby producing a control signal having dynamic characteristics better suited for achieving close control than simple proportioning action.

Although such conventional "three-function" controllers are effective with many industrial processes, there are still other processes which have not been satisfactorily controllable by such techniques. For example, processes having complex higher-order delay characteristics, or a dead-time delay, such as so-called "transportation lag," frequently present severe control problems which cannot adequately be handled by the more common control system arrangements. Also, certain types of measuring devices inherently introduce effective "dead-time" delays in developing a condition measurement signal, and thereby make the overall process control problem significantly more difficult to handle.

In general, it is an object of the present invention to provide improved systems and techniques for controlling processes which are difficult to control due to time lags appearing either in the process itself, or in the external loop of the control system.

In the drawings:

FIG. 1 is a schematic diagram of one embodiment of the invention; and

FIG. 2 is a schematic diagram of a timing unit adapted to provide internally programmed operation of the control system.

Referring now to FIG. 1, there is symbolically indicated by block 10 a process having two input pipes 12 and 14 and an output pipe 16. This is a generalized showing intended to represent any one of many different types of processes, and thus the specific configuration illustrated is not to be considered a limitation. The control objective for the process shown in FIG. 1 is to maintain constant some variable condition of the material flowing through the output pipe 16. Control over this condition is, in the example selected, exercised by altering the flow rate of material entering through the lower input pipe 14, as by means of a conventional pneumatically-operated process valve generally indicated at 18.

In one application of the invention, the process 10 may have a relatively long dead-time delay between a change in the process valve 18 and a corresponding variation in the measured condition of the material flowing in the output pipe 16. For example, the process may be a cracking furnace in which there is a substantial time required to transport the product from the operating regions of the process to the place in the output pipe where the condition measurement is made. Other examples of processes having long dead-time delays are those wherein material is carried on a conveyor from one position in the process to another position where a measurement is made, e.g. from a control gate at one end of a conveyor belt to a weigh cell at the other end.

The controlled process condition is measured by any appropriate instrument which in FIG. 1 is indicated symbolically at 20. This measuring instrument produces an output signal in the form of an electric current (e.g. within the range of 10–50 milliamps) flowing through a pair of leads 22 and arranged to develop a corresponding voltage across a resistor 24. In one commercial form of the apparatus, resistor 24 had an ohmic resistance of 100 ohms and produced a measurement voltage in the range of 1–5 volts. In the principal embodiment described hereinbelow in detail, instrument 20 is of the type which continuously measures the controlled process condition, so that the voltage across resistor 24 continuously indicates by its magnitude the value of the process condition.

The measurement signal across resistor 24 is compared with a "set" signal of opposite polarity developed across a second resistor 26 by a current from a D-C power source 28. This current is adjustable in magnitude by a variable impedance 30 so as to fix the set signal voltage at any desired value, for example in the range of 1–5 volts. The measurement and set signals are compared in this circuit to produce between circuit points 32 and 34 a deviation signal indicating by its magnitude and polarity the extent and direction of any difference between the measured process condition and the desired value thereof.

In carrying out the present invention, the control system of FIG. 1 alternates between relatively short periods of active automatic control and relatively longer periods of fixed valve position. During the former periods, the valve is adjusted in conventional fashion, e.g. it may be shifted in response to a deviation signal at circuit points 32, 34. During the periods of fixed valve position, the process valve remains in the position to which it had been adjusted at the end of the preceding short period of automatic control.

The position of the process valve 18 is determined by a pneumatic pressure signal from a conventional electric-to-air transducer 36. This transducer receives an electrical input signal over a line 38 connected to one output circuit 40 of a high-gain operational amplifier 42. This amplifier includes a second output circuit 44, 46 producing a current directly proportional to the output signal in the first circuit 40. These two output circuits may be conductively isolated, to avoid problems due to common ground connections. An amplifier having these characteristics is disclosed in detail in copending application Ser. No. 507,765, filed Nov. 5, 1965, by D. A. Richardson et al. which issued as Pat. 3,467,874.

Amplifier 42 forms the basic element of an analog process controller of known design. By means of a switchover relay 48, this controller is periodically switched between a fixed-output status and an active automatic control status. When relay 48 is in the fixed-output position (as shown), one set of its contacts 50, 52 connects a capacitor 54 between the lower amplifier output lead 46 and one amplifier input terminal 56. The other amplifier input terminal 58 is connected by another set of relay contacts 60, 62 to the other (upper) amplifier output lead 44. This interconnection arrangement establishes a negative feedback circuit for the amplifier 42 tending to hold the output current flowing through the output circuits 40 and 44, 46 at a value proportional to the voltage on capacitor 54. By using a good quality capacitor 54 and an amplifier having a very high input impedance, the charge on the capacitor will not leak off at any significant rate, and thus the amplifier output will be held essentially constant.

The magnitude of the current from the amplifier output circuit 44, 46 will be that which produces across a "proportioning" potentiometer 64 a voltage equal to the voltage stored on the memory capacitor 54. That is, the negative feedback action drives the amplifier input voltage to essentially zero, and it will be apparent that under this condition the voltage across potentiometer 64 equals the capacitor voltage.

As will be explained hereinbelow in more detail, capacitor 54 serves as a memory device which "remembers" the controller output existing at the end of each period of active automatic control operation, i.e. at the instant of switchback to fixed-output operation, and automatically fixes the controller output to that value when the system switches to fixed-output status. Other types of memory devices can be used for this function, depending of course upon particular application requirements. A capacitor is a practical device for this purpose because relatively inexpensive capacitors can be obtained commercially which are sufficiently stable and free from leakage effects to hold the amplifier output at the desired value without substantial drift.

The proportioning potentiometer 64 includes a movable arm 66 which picks off a part of the controller output voltage and directs it to a negative feedback network generally indicated at 68. As explained in the above-identified copending application Ser. No. 507,765, which issued as Pat. 3,467,874, such a feedback circuit is adapted to provide both "proportioning" and "reset" action when suitably connected to the input circuit of the amplifier 42. However, when the control system is connected for fixed-output operation (as shown in FIG. 1), the feedback circuit is not connected to the amplifier input. Instead, the reset capacitor 70 is connected by relay contacts 72, 74 directly to the junction 76 of the series-connected resistors 78 and 80 so that neither the feedback signal nor the deviation signal is applied to the amplifier input circuit.

With reset capacitor 70 connected to junction 76, the voltage on the reset capacitor is continuously varied automatically so as to reflect the difference between the deviation signal (circuit points 32, 34) and the feedback signal (potentiometer arm 66). Subsequently, when the switchover relay 48 is actuated, the reset capacitor 70 is disconnected from junction 76, the deviation signal is applied from circuit point 76 through relay contacts 74, 82 to the lower amplifier input terminal 58, and the reset capacitor is connected to the other amplifier input terminal 56 through relay contacts 50, 84. Thereby the amplifier 42 is connected as an analog process controller, and produces an output signal suitably responsive in known manner to the deviation signal on circuit points 32, 34.

It may particularly be noted that because the reset capacitor 70 was connected to circuit point 76 just prior to switchover to automatic control, the input voltage applied to amplifier 42 just after switchover will be essentially zero. Thus, there will be no sudden change of any significant amount in the output current flowing through either of the amplifier output circuits. Consequently, the switchover to automatic control operation will be effected without any large shift in the position of the process valve 18 and accordingly without undue disturbance to the process 10.

While the system is on active automatic control operation, the control signal directed to the transducer 26 (and thence to the process valve 18) will be responsive to any deviation signal and will adjust the valve position as required to tend to maintain the measured process condition constant. This control signal will include proportioning and dynamic characteristics determined by the particular settings of the feedback circuitry for the amplifier 42, e.g. the settings of the potentiometer 64 and the variable reset resistor 86. The controller also can be provided with rate action by means of additional circuitry such as disclosed in the above-identified copending application Ser. No. 507,765.

While the control system is operating automatically to adjust the process valve 18 towards a setting suited for maintaining the measured condition constant, the memory capacitor 54 is automatically tracking that signal and continuously storing a voltage proportional thereto for future use. To this end, capacitor 54 is connected by relay contacts 88, 62 directly across proportioning potentiometer 64. This connection arrangement maintains the capacitor voltage exactly equal to the controller output voltage appearing across this potentiometer. Accordingly, when the switchover relay 48 subsequently is de-energized to transfer the control system back to fixed-output status, the capacitor 54 will serve through feedback action (as described hereinabove) to maintain the output current flowing through potentiometer 64 fixed at the value existing just prior to switchback. Thus it is that the signal to the process valve will be held positively at its level just prior to switchback to fixed-output status.

As an illustration of suitable means to actuate the switchover relay 48 at periodic intervals, there is provided in the preferred embodiment a relay driver unit generally indicated at 90. This unit is triggered by a timer unit generally indicated at 92 and associated with the measuring instrument 20. The timer unit 92 may, for example, include a solid-state circuit, such as illustrated in FIG. 2, arranged to produce on its output terminals 94, 96 a series of positive trigger pulses of 100 to 400 milliseconds duration at equal intervals, e.g. adjustable between 0.5 minute and 30 minutes. The particular time interval selected will depend primarily upon the magnitude of the dead-time lag in the process 10.

Each positive pulse produced by the timer unit 92 is applied through relay driver input terminals 98 and an isolating diode 100 to the base of a transistor amplifier 102. This transistor is normally non-conducting, and the timing pulse applied to its base causes it to conduct heavily so that its collector is driven negative. This negative signal is coupled through a relatively large capacitor 104, a potentiometer 106, and a diode 108 to the input circuit of a two-transistor amplifier generally indicated at 110.

Transistor amplifier 110 is normally conducting, and the application of a negative pulse to its input circuit cuts it off so that its output voltage at terminal 112 rises. This voltage rise serves to turn on another two-transistor amplifier 114, the output current from which passes through an isolating diode 116 to the winding 118 of the switchover relay 48, thereby to actuate this relay. The relay operating current is derived from a power source 120 in series with the relay winding. As noted hereinabove, actuation of relay 48 serves to switch the system to active automatic control status.

Once the relay driver 90 has been turned on by the trigger from timer 92, the output current from the relay driver continues to flow at full value (sufficient to hold relay 48 actuated) for a preset period of time, e.g. adjustable within a range between 0.5 and 30 seconds. This adjustment is effected by potentiometer 106 the setting of which determines the charging rate for capacitor 104, and thereby determines the instant at which amplifier 110 resumes conduction.

In more detail, after transistor 102 starts to conduct, the resultant negative signal applied to capacitor 104 causes this capacitor to begin charging up through the resistance of potentiometer 106. This charging current gradually raises the potential at the input to amplifier 110 until the conductive region is reached. The output current from amplifier 110 flows through a resistor 122 which is common to the emitter circuit of transistor 102. The current already flowing through this resistor from transistor 102 is not sufficient by itself to raise the emitter potential into its non-conducting region, but the added current from amplifier 110 raises the potential of this emitter sufficiently to cut transistor 102 off. The relay driver circuit 90 thereupon resets to its normal quiescent state, with no current flowing through the winding 118 of relay 48. Thus this relay drops out, and the control system reverts to its fixed-output status pending receipt of the next trigger pulse from timing unit 92.

The timing unit 92 may be any one of a number of different conventional devices for producing the desired trigger signal. For detailed information on the particular circuit shown in FIG. 2, reference may be had to the GE Transistor Manual, 7th ed., 1964, p. 322. It will be noted herein only that this timing unit includes a primary timing circuit 124 and a secondary pulsing circuit 126. The timing circuit 124 comprises an RC charging network composed of a capacitor 128 and a resistor 130, the latter being adjustable to provide the desired timing range of 0.5 minute to 30 minutes. This timing circuit 124 is coupled through an isolating diode 125 to control the firing of a unijunction 132. When the control electrode of this unijunction reaches firing potential, it delivers current to a resistor 134 to produce a corresponding trigger pulse at output terminals 94, 96. The input resistance of the unijunction drops to a very low value while it is conducting, and thus serves to discharge capacitor 128. The pulsing circuit 126 includes additional RC circuitry arranged to produce rapid voltage pulsations which are coupled to the unijunction 132 in order to assure proper and stable functioning thereof over the relatively long timing periods involved.

The present invention also is applicable to processes wherein the condition measuring instrument inherently introduces a time lag of substantial duration. For example, the measuring instrument 20 might be of a type which periodically withdraws a sample of the material flowing through output pipe 16 and performs an analysis of the sample so as to produce an output signal indicating the magnitude of some characteristic of the material. Such sampling and analysis operation can require a substantial time, depending upon the nature of the particular measuring instrument involved. Since this represents a time delay which is effectively in the overall control loop, and thus comparable in effect to a process dead-time lag, it may be desirable to activate the automatic control portions of the system only for a short period of time following each completed sample measurement.

This can be done in accordance with another embodiment of the present invention by providing the measuring instrument 20 with a conventional switch control circuit (not shown) which normally maintains the terminals 94 and 96 shorted together and thereby normally holds the transistor amplifier 102 in its non-conducting state. As explained above, this in turn maintains relay 48 deactivated so as to hold the control system in its fixed output status. Periodically, the instrument 20 will analyze a sample of the material flowing in output pipe 16 and, when the analysis is complete, the current flowing through resistor 24 will automatically be set (by known means) to a level representing the measured value of the process condition.

When the analysis is complete and the measurement signal corresponds to the analyzed condition, conventional means are made operative to remove the short-circuit between terminals 94 and 96 and initiate conduction through amplifier 102. Such conduction can, for example, be initiated by a positive voltage introduced through a bias resistor 140 connected between the positive voltage line 142 and the input diode 100 so as to apply a positive signal to the amplifier 102 whenever terminals 94 and 96 are unshorted. As described hereinabove in detail, conduction through amplifier 102 serves to produce a current pulse of predetermined short duration through the winding 118 of relay 48, so as to actuate this relay and initiate a corresponding short period of active automatic control based on the just completed sample measurement.

It may be noted that switching the controller in an alternating fashion between active automatic control status and fixed-output status produces the effect of providing an apparent increase in the reset time constant, relative to that which would exist were the reset capacitor to be coupled continuously in the feedback circuit of the amplifier. It is evident that certain practical advantages may derive from the characteristic, for example in reducing the size of reset capacitor required to effectively control a given process.

What is claimed is:

1. A control system used with an industrial process to maintain a condition of the process constant in the face of varying loads and comprising, in combination:
   sensing means coupled to the process to produce a measurement signal representing the magnitude of a preselected condition of the process;
   adjustable set signal means producing a signal representing the desired magnitude of said process condition;
   comparison means arranged to receive said measurement and set signals and to produce a deviation signal corresponding to the difference therebetween;
   a controller including a high-gain amplifier adapted to receive said deviation signal, said controller serving when activated by said deviation signal to develop an output signal;
   signal-responsive operating means including a process valve or the like for adjusting a process variable which influences said process condition;
   means for directing to said operating means a control signal corresponding to said output signal;
   a feedback circuit arranged to develop a feedback signal responsive to said output signal;
   first and second memory means adapted to store signals representing the energy status of respective electrical circuits;
   switch means operable into first and second states, said switch means serving in said first state to: (1) couple said deviation and feedback signals to said amplifier input in opposition to one another, and (2) couple to said first memory means a signal corresponding to said output signal;

said switch means serving in said second state to: (1) couple said first memory means to said amplifier to fix said output signal and said control signal at the level existing at the instant of switchover from said first state to said second state, and (2) couple said deviation and feedback signals directly to said second memory means to store therein a signal corresponding to the difference between said deviation and feedback signals;

said switch means including circuit means operable at switchback from said second state to said first state to couple said second memory means to said amplifier input together with said deviation and feedback signals so as to produce a zero amplifier input voltage and thus minimize any sudden substantial change in the amplifier output at switchback from said second state to said first state;

switch control means operable to transfer said switch means between said first and second states, said switch control means including means to hold said switch means in said first state for a predetermined period of time and then to transfer said switch means to said second state awaiting switchback to said first state; and cycling means operable continuously to activate said switch control means to effect the transfer of said switch means in an alternating fashion in accordance with a predetermined pattern providing short periods of active automatic control for said process condition separated by intervening periods with the control signal fixed at the level it had at the end of the preceding short period of active automatic control.

2. The control system of claim 1, wherein said second memory means is in said feedback circuit and serves to produce reset action in said control signal.

3. The control system of claim 2, wherein said first and second memory means are electrical capacitor elements.

4. The control system of claim 3, wherein said first memory capacitor is connected by said switch means to the input of said amplifier to hold said control signal fixed in magnitude between the periods of active automatic control.

5. The control system of claim 1, wherein said cycling means comprises an electronic circuit operable independently of the functioning of said sensing means and arranged to produce periodic timing pulses for said switch control means, and means for varying the cycle time of said periodic timing pulses.

6. The control system of claim 1, wherein said holding means of said switch control means includes adjustment means for setting the length of said predetermined period of time of active automatic control.

7. The method of controlling an industrial process so as to maintain a condition thereof substantially constant and comprising a continuous series of operating cycles each including the steps of: (1) sensing the value of the controlled process condition; (2) producing for a first predetermined period of time an automatic control signal responsive to and varying with the sensed value of the process condition; (3) adjusting a process variable in accordance with said automatic control signal during said first period of time in such a way as to tend to minimize changes in said process condition; (4) locking said process variable to the level it reaches at the end of said first predetermined period of time; and (5) maintaining said process variable fixed at said level for a second predetermined period of time following said first period of time.

8. The method of controlling an industrial process so as to maintain a condition thereof substantially constant and comprising a continuous series of operating cycles each including the steps of: (1) sensing the value of the controlled process condition; (2) producing for a first predetermined period of time an automatic control signal including a reset component, said control signal being responsive to the sensed value of the process condition; (3) adjusting a process variable in accordance with said automatic control signal during said first period of time so as to tend to reduce changes in said process condition; (4) controlling a memory device so that its stored value follows said automatic control signal during said first period of time; (5) utilizing said stored value of said memory device to lock said process variable to the level it reaches at the end of said first predetermined period of time; and (6) maintaining said process variable fixed at said level for a second predetermined period of time following said first period of time.

9. The method of controlling an industrial process so as to maintain a condition thereof substantially constant and comprising a continuous series of operating cycles each including the steps of: (1) sensing the value of the controlled process condition; (2) producing for a first predetermined period of time an automatic control signal including a reset component, said control signal being responsive to the sensed value of the process condition; (3) adjusting a process variable in accordance with said automatic control signal during said first period of time so as to tend to reduce changes in said process condition; (4) controlling a first memory device so that its stored value follows said automatic control signal during said first period of time; (5) utilizing said stored value of said first memory device to lock said process variable to the level it reaches at the end of said first predetermined period of time; (6) maintaining said process variable fixed at said level for a second predetermined period of time following said first period of time; (7) controlling a second memory device so that its stored value reflects the sensed-value of said process condition; and (8) utilizing the stored value of said second memory device to minimize change of the control signal during switchback to the next period of active automatic control.

10. A control system used with an industrial process to maintain a condition of the process constant in the face of varying loads and comprising, in combination:

sensing means coupled to the process to produce a measurement signal representing the magnitude of a preselected condition of the process;

adjustable set signal means producing a signal representing the desired magnitude of said process condition;

comparison means arranged to receive said measurement and set signals and to produce a deviation signal corresponding to the difference therebetween;

a controller including a high-gain amplifier adapted to receive said deviation signal;

signal-responsive operating means including a process valve or the like for adjusting a process variable which influences said process condition;

means for directing to said operating means a control signal derived from the output of said amplifier;

a feedback circuit arranged to develop a feedback signal responsive to said amplifier output;

memory means arranged to store a signal representing the energy status of an electrical circuit, said memory means being adapted to be coupled to said amplifier to introduce in said amplifier output dynamic time-variant characteristics to accommodate corresponding dynamic characteristics of the process, thereby to provide close and stable control of the process;

switch means operable into first and second states;

said switch means serving in said first state to couple said memory means operatively to said amplifier so as to introduce said dynamic characteristics in said amplifier output;

said switch means serving in said second state to effectively decouple said memory means from said amplifier so as to eliminate said dynamic characteristics from said output signal while holding the level of signal stored in said memory means substantially constant; and cycling means operable continuously to transfer said switch means between said first and second states in an alternating fashion in accordance with a predetermined pattern providing periods of automatic control with dynamic time-variant characteristics for said process condition separated by intervening periods during which said control signal is free from said time-variant characteristics.

11. Apparatus as claimed in claim 10, wherein said memory means is operable to develop reset action.

12. Apparatus as claimed in claim 11, wherein said memory means is a capacitor adapted to be coupled in said feedback circuit to effect reset action.

References Cited

UNITED STATES PATENTS

| Re. 26,573 | 4/1969 | Nazareth | 330—10 |
| 2,697,022 | 5/1954 | McIlheny | 318—28 |
| 3,467,874 | 9/1969 | Richardson et al. | 328—1 |

HENRY T. KLINKSIEK, Primary Examiner

U.S. Cl. X.R.

251—30